United States Patent [19]
Dall

[11] 3,761,679
[45] Sept. 25, 1973

[54] ELECTRODE AIR-HUMIDIFIER
[76] Inventor: Hans Hilmar Dall, Egamosevej 8, 8250 Ega, Denmark
[22] Filed: June 3, 1971
[21] Appl. No.: 149,737

[30] Foreign Application Priority Data
June 4, 1970 Denmark .......................... 2930/70

[52] U.S. Cl................ 219/288, 122/451, 137/392, 204/290 R, 219/272, 219/286, 219/295, 338/86
[51] Int. Cl........................................................ H05b
[58] Field of Search ......................... 219/284–295, 271–276; 338/80–86; 137/392; 204/290 R; 122/451, 396

[56] References Cited
UNITED STATES PATENTS

| | | | |
|---|---|---|---|
| 2,959,717 | 11/1960 | Conger .......................... | 317/148.5 R |
| 2,748,254 | 5/1956 | Watson ............................. | 219/286 |
| 1,715,512 | 6/1929 | Rochester .......................... | 219/289 |
| 2,556,656 | 6/1951 | Lohman ............................ | 219/286 |
| 1,462,350 | 7/1923 | Merrill .............................. | 219/286 |
| 3,477,460 | 11/1969 | Dotto ................................ | 137/392 |
| 3,297,972 | 1/1967 | Hyde ................................. | 219/285 X |
| 3,398,261 | 8/1968 | Mays ................................. | 219/293 X |
| 1,744,505 | 1/1930 | Robinson ........................... | 219/288 |
| 2,050,607 | 8/1936 | Hallman ............................ | 219/288 |
| 1,806,729 | 5/1931 | Aitken ............................... | 219/288 X |

FOREIGN PATENTS OR APPLICATIONS

| | | | |
|---|---|---|---|
| 254,369 | 12/1948 | Switzerland ........................ | 219/295 |
| 380,836 | 9/1923 | Germany ............................ | 219/285 |
| 1,139,911 | 1/1969 | Great Britain ..................... | 219/295 |

Primary Examiner—A. Bartis
Attorney—Laurence, Hueschen & Laurence

[57] ABSTRACT

An electrode air humififier for providing a substantially constant rate of steam generation irrespective of variations in the conductivity of the supply water includes a water tank having a water inlet, a steam outlet and a plurality of electrodes downwardly projecting into the water within the tank. The electrodes each have a pair of substantially planar surfaces whose current carrying area progressively increases in an upward direction. The electrodes are positioned so that each planar surface of each electrode faces a different planar surface of an adjacent electrode and the distance between the facing planar surfaces of adjacent electrodes progressively decreases in an upward direction. To avoid precipitation of solid materials onto the electrodes from the water, the surfaces of the electrodes are covered with polytetraflouroethylene uncorporating with electrically conductive pigment. The water level in the tank is controlled in response to current flow to the electrodes.

5 Claims, 4 Drawing Figures

CONDUCTIVE PLASTIC COATING

INVENTOR
HANS HILMAR DALL

BY  _____
ATTORNEY

ELECTRODE AIR-HUMIDIFIER

The invention relates to an electrode air-humidifier providing a substantially constant rate of steam generation.

Electrode air-humidifiers are known where the evaporation of water is brought about by inducing voltage on electrodes immersed in the water so that a current of greater or lesser strength passes through the water and makes it boil.

In these known electrode air-humidifiers the current passing through the water is very much dependent on the hardness, that is the conductivity of the water; thus a humidifier containing a definite quantity of water may act completely different at different places dependent on the hardness, that is the conductivity of the local water used.

Furthermore, electrode air-humidifiers are known which are automatically filled up with water gradually as the water evaporates. To this end float-controlled contacts are usually employed, maintaining a substantially constant level of the liquid. The above mentioned inconvenience caused by differences of the hardness, that is the conductivity of the water is especially significant here, because the constant level of the liquid results in heterogenous evaporation.

The purpose of the present invention is to provide an electrode air-humidifier, which in a simple way overcomes these difficulties, and which — although of comparatively small dimensions — gives a rather large and substantially constant rate of steam generation, irrespective of the hardness, that is the conductivity of the water.

According to the invention, this is obtained by the special form of the electrodes and their mutual position, so that the current as a function of the water level has a greatly increasing characteristic, the current being sensed by an electronic device controlling the water supply.

Accordingly, a small increase of the water level at the same electrode voltage results in a great increase of the current, so that soft water within feasible dimensions of the water tank at a comparatively small increase of the water level can produce the same effect as harder water. Furthermore, the current, being sensed in a rather simple way, can control the water supply so that this stops when the desired effect, i.e., the desired steam generation is obtained.

According to the invention, the electrodes may be formed as elongated, plane, isosceles triangles having the angles between the equal length sides pointing downwards. Thus a small increase of the water level results in a continuous increase of the electrode area. To save space, the top part of each triangle may be cut off so that each electrode becomes trapeziform.

The electrodes may further, according to the invention, be placed in such a way that the horizontal distance between them decreases from below upwards. This gives a further increase of the current, gradually as the water level rises, because the liquid path between the electrodes and consequently the resistance will be decreasing.

For electrode air-humidifiers meant for three-phase operation, the three electrodes are according to the invention preferably bent along their central or symmetry line in such a way that the border line of each flap thus formed with the surface of the water at any water level is parallel with the border line of the corresponding flap of the adjacent electrode, the bending line being arranged along the edges in a tetrahedron with equilateral base.

In order to avoid solid materials, precipitated from the water, depositing on the electrodes, thereby impeding the current between the electrodes, these electrodes may, according to the invention, preferably be covered wit a plastic material, such as polytetrafluorethylene, in which an electric conducting pigment is incorporated.

With such a covering precipitate deposited on the electrodes, does not adhere and consequently — falls to the bottom of the tank and is easily washed away.

The produced quantity of steam may be regulated by an adjustable means in the electronic controlling device.

In the following detailed description the invention is explained in detail wtih reference to the accompanying drawings showing an embodiment of the invention, and in which FIG. 1 shows a schematic diagram of an electrode air-humidifier for three-phase operation, FIG. 2 is a partly sectional view of the water tank shown in FIG. 1.

Figure 1:
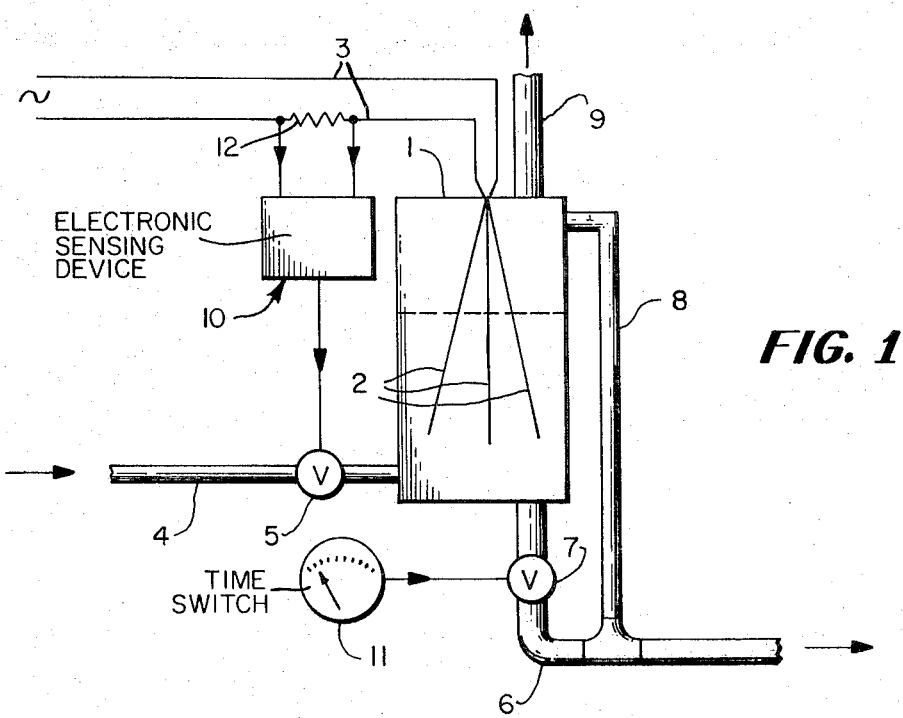

In FIG. 1, 1 is a water tank in which three electrodes 2 are arranged, being connected with a not shown A.C. voltage source by means of an electric cable (3-phase) 3. The tank is provided with a water supply 4 with a magnetic valve 5 and an outlet 6, which is provided with a magnetic valve 7. The tank has an overflow pipe 8 connected with the outlet 6. The outlet of steam takes place through a pipe 9.

The magnetic valve 5 for the water supply is controlled by an electronic device 10, and the magnetic valve 7 for the outflow of water is controlled by a time switch 11 or by a programmer.

The electrode air-humidifier thus indicated operates in the following way:

In starting position the magnetic valve 5 is open and the magnetic valve 7 is closed. The water enters into the tank 1, and gradually as the tank is filled the power consumption increases because the water path between the electrodes is still increasing. When the power consumption has reached a certain previously fixed-value, for instance 6 kilowatt, the electronic device 10 declutches the magnetic valve 5, and the water supply stops. During the steam generation the water is consumed, and consequently the current decreases correspondingly. When the effect has fallen to a previously fixed value, for instance 5 kilowatts, the electronic device 10 reopens the valve 5, and the water tank is replenished. Thereafter the process is repeated as described. The steam generation varies only a little because at regular intervals the tank is filled up with water, gradually as it is used.

After for instance one hour the time switch 11 opens the valve 7, and the hot water with salts separated from the evaporated water streams out from the tank through the outlet 6. Now the power consumption decreases, and the electronic device 10 reopens the valve 5 whereby the tank 1 is rinsed out to remove possible impurities, as the outlet valve 7 has a greater capacity than the inlet valve 5. After about 1 minute the outlet valve 7 closes again, while the inlet valve 5 remains open until the tank 1 is filled sufficiently up to take such a load that the electronic device 10 causes the inlet valve 5 to close. After 20 seconds the steam generation is again at a maximum.

Figure 2:
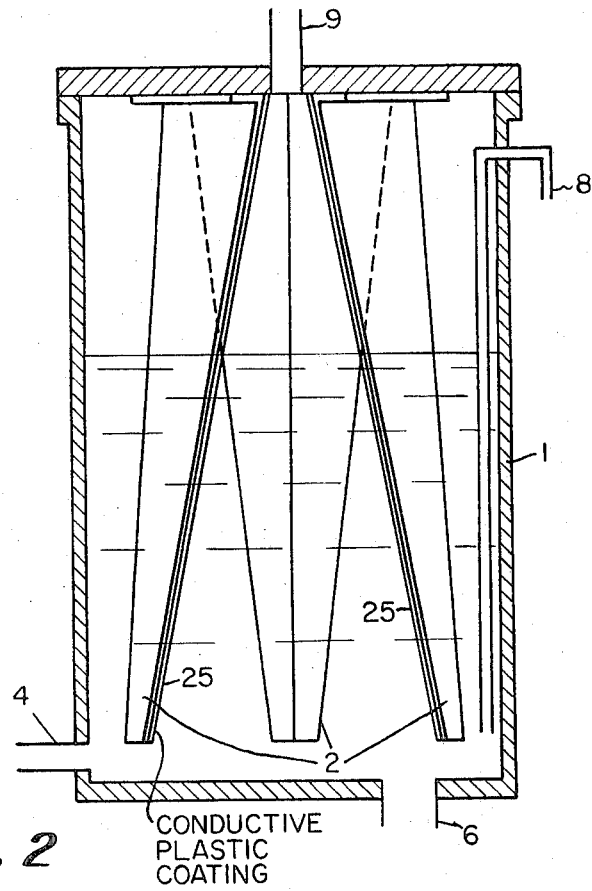
Figure 3:
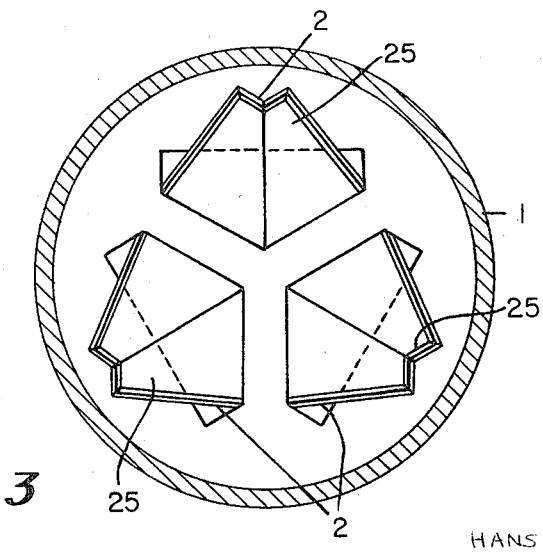
FIG. 3 shows the electrodes shown in FIG. 2 as seen from below.

In FIGS. 2 and 3 the form and position of the electrodes are more clearly indicated. It can be seen how the electrode area increases in an upward direction corresponding to an increase in the water level, and the distance between the electrodes decreases in an upward direction. Preferably the electrodes have the general configuration of isosceles triangles with the vertex angles of each triangle pointing downwardly. The triangle may be truncated at the bottom to obtain a trapeziform shape.

The effect of even considerable differences of the conductivity of the water can therefore be offset by relatively small differences of the water level, and as the steam generated is substantially proportional with the effect, a practically constant steam generation is obtained by controlling of the water supply irrespective of the conductivity of the water. The electrodes are bent in such a way that horizontal generatrices form an angle of 120° with each other. The electrodes may be bent on their symmetry lines so that the borderline of each flap thus formed with the surface of the water at any water level is parallel with the borderline of the corresponding flap of the adjacent electrode, with the bending lines being arranged along the edges of a tetrahedron with an equilateral base. The substantially planar working faces of the electrodes are coated with a plastic material such as polytetrafluoroethylene which coating is made electrically conductive by incorporating an electrically conducted pigment into the plastic.

Figure 4:
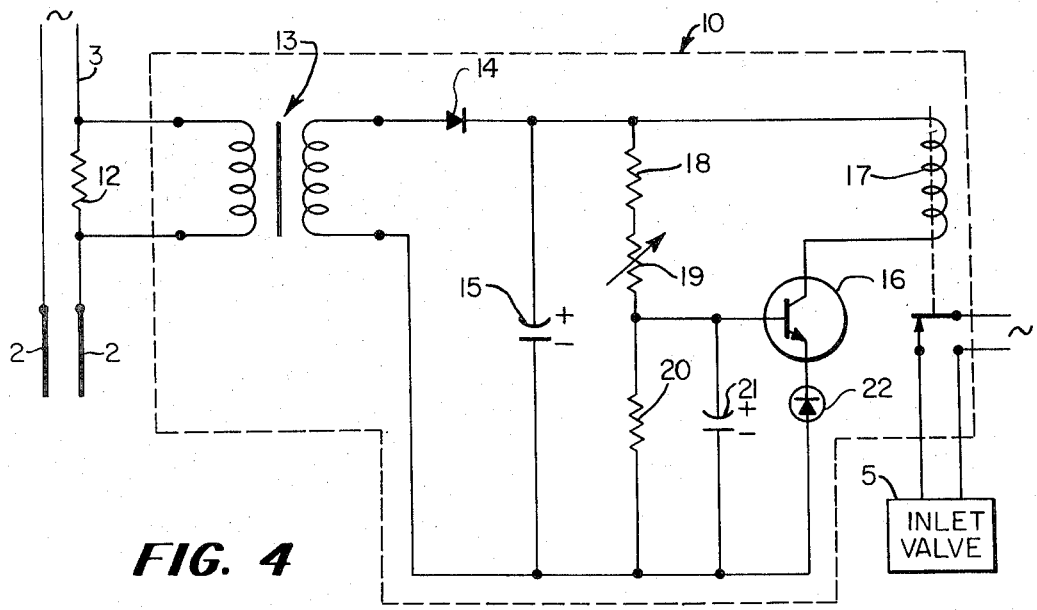
FIG. 4 is a schematic diagram of the electronic device.

In FIG. 4 the electronic load sensing device is shown. The voltage drop over resistance 12 in one of the supply lines is connected to the primary side of a transformer 13, the secondary side of which is connected to a transistor circuit consisting of a rectifier 14 with a smoothing capacitor 15 and a transistor 16 with a relay 17 inserted in the collector circuit. The base is connected to a voltage divider consisting of a constant resistance 18, a variable resistance 19, and a constant resistance 20, the latter being in parallel with a capacitor 21. The emitter is earth connected over a diode 22 with a certain liminal value.

When the load through the supply lines to the electrodes increases, the voltage drop over the resistance inserted in one of the supply lines also increases. When the current reaches a certain predetermined value, the transistor 16 will be conducting and the relay 17 reacts whereby its contacts cut off the current to the magnetic valve 5 shutting off the water supply. Gradually as the water evaporates, the load will fall, and at a certain low voltage drop over the resistance in the supply lines, the transistor will be blocked so that the relay 17 is deenergized and the current to the magnetic valve 5 is again switched on, and water again flows into the tank. By adjusting the potentiometer 19 the current, by which the transistor 16 becomes conducting, and consequently also the steam generation, may be regulated.

What I claim is:

1. In an electrode air humidifier for generating steam having a water tank provided with a water inlet and steam outlet, and electrodes within said tank projecting downwardly into water therein, wherein the improvement comprises said electrodes comprising at least three electrodes, each of said electrodes having an overall configuration generally corresponding to an elongated isosceles triangle having its vertex angle pointing downwardly, each electrode being bent on a symmetry line in such a way that the borderline of each flap thus formed, with the surface of the water at any water level, is parallel with the borderline of the corresponding flap of the adjacent electrode, the bending lines being arranged along the edges of a tetrahedron with an equilateral base, said electrodes being slanted away from the vertical decreasing the horizontal distance between electrodes from the bottom towards the top.

2. In an electrode air humidifier according to claim 1, wherein the lower portions of said electrodes are truncated so that the electrodes become trapeziform.

3. In an electrode air humidifier for generating steam having a water tank provided with a water inlet and a steam outlet, and electrodes within said tank projecting into water therein, wherein the improvement comprises substantially all the exposed active electrode surfaces of said electrodes being covered with a plastic material in which an electrically conductive pigment is incorporated to make the plastic electrically conductive.

4. In an electrode air humidifier according to claim 3, wherein said plastic material is polytetrafluoroethylene.

5. An electrode air humidifier for providing a substantially constant rate of steam generation irrespective of variations in the conductivity of supply water, comprising a water tank having a water inlet and a steam outlet, an inlet valve regulating water flow through said water inlet, a plurality of electrodes within said tank projecting downwardly into water therein, current supply lines connected to said electrodes, each of said electrodes having a pair of substantially planar current carrying surfaces whose horizontal dimension progressively increases in an upward direction, said electrodes being positioned relative to each other so that each planar surface on each electrode faces a different planar surface of an adjacent electrode and the horizontal distance between the adjacent current carrying surfaces of adjacent electrodes progressively decreases in an upward direction, and means responsive to current flow in one of said current supply lines to control the operation of the inlet valve to adjust the water level in said tank.

* * * * *